(12) United States Patent
Yamaguchi et al.

(10) Patent No.: US 7,445,242 B2
(45) Date of Patent: Nov. 4, 2008

(54) VEHICLE STEERING SYSTEM

(75) Inventors: Hiroshi Yamaguchi, Saitama (JP); Yuichi Shimada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 339 days.

(21) Appl. No.: 11/086,782

(22) Filed: Mar. 22, 2005

(65) Prior Publication Data

US 2005/0218642 A1    Oct. 6, 2005

(30) Foreign Application Priority Data

Mar. 30, 2004    (JP)    ............... 2004-099647
Mar. 30, 2004    (JP)    ............... 2004-099648

(51) Int. Cl.
*B62D 1/16*    (2006.01)
(52) U.S. Cl. .................. 280/780; 280/779; 74/492; 464/180
(58) Field of Classification Search ............... 280/779, 280/780, 777, 775; 74/492; 464/140, 162, 464/51, 91, 180; 188/378, 379, 381; 267/139, 267/140
See application file for complete search history.

(56) References Cited

U.S. PATENT DOCUMENTS 1,714,786 A * 5/1929 Hughes .................. 180/90.6
3,300,229 A * 1/1967 Kishline .................. 280/780
5,816,615 A * 10/1998 Dupont et al. ............ 280/780

FOREIGN PATENT DOCUMENTS

| JP | 02-82673 | 6/1990 |
|---|---|---|
| JP | 09-242880 | 9/1997 |
| JP | 10-095352 | 4/1998 |
| JP | 11-334606 | 12/1999 |
| JP | 2003-194230 | 7/2003 |

* cited by examiner

*Primary Examiner*—Kevin Hurley
*Assistant Examiner*—Drew J. Brown
(74) *Attorney, Agent, or Firm*—Carrier, Blackman & Associates, P.C.; William D. Blackman; Joseph P. Carrier

(57) ABSTRACT

A vehicle steering system includes a sound absorbing material made of sponge and attached to an elastic joint which connects a second steering shaft extending from a steering wheel and a third steering shaft extending from a steering gear box to each other. The sound absorbing material faces an opening in a joint cover which is mounted on a dashboard and through which the second steering shaft passes. Therefore, the sound absorbing material absorbs noise which is produced in the steering gear box such that the noise does not pass from the engine room side through the opening in the joint cover to the vehicle compartment side, thereby preventing transmission of the noise to the vehicle compartment side. Further, the sound absorbing material requires only a simple shape and construction, thereby reducing the cost. Furthermore, the sound absorbing material does not come into sliding contact with the second steering shaft, and thus does not produce sliding noise or sliding resistance.

19 Claims, 13 Drawing Sheets

VEHICLE STEERING SYSTEM

RELATED APPLICATION DATA

Japanese priority application Nos. 2004-99647 and 2004-99648, upon which the present application is based, are hereby incorporated in their entirety herein by reference.

BACKGROUND OF THE INVENTION

1. Field of the Invention

The present invention relates to a vehicle steering system including an upper steering shaft extending downward from a steering wheel provided in a vehicle compartment to pass through an opening in a joint cover mounted on a dashboard, a lower steering shaft extending upward from a steering gear box provided in an engine room, and a joint connecting the upper steering shaft to the lower steering shaft. Also, the present invention relates to such a vehicle steering system in which the steering shaft passes through an opening in the dashboard which separates the engine room containing the steering gear box from the vehicle compartment containing the steering wheel, a grommet is fixed to the steering gear box so as to surround an outer periphery of the steering shaft, and a lip of the grommet abuts against a circumference of the opening in the dashboard.

2. Description of the Related Art

A steering shaft which connects a vehicle steering wheel to a steering gear box passes through an opening in a dashboard which separates an engine room from a vehicle compartment. To prevent engine room noise from entering the vehicle compartment through the opening in the dashboard, a rubber sealing member is fitted in the opening. Japanese Patent Application Laid-open No. 9-242880 discloses a steering system which improves sound insulation performance by superposing two sealing devices each of which comprises a stationary annular portion fixed to an opening in a dashboard, flexible bellows formed integrally on the inner periphery of the opening, and a sealing portion formed integrally on the inner periphery of the flexible bellows and slidably abutting against an outer peripheral surface of a steering shaft.

However, in the conventional steering system, the sealing devices have a complicated structure, resulting in an increased cost. In addition, there are possibilities that sliding noise is generated from a sealing portion of the sealing devices which abuts against the outer peripheral surface of the steering shaft, and steering feeling is deteriorated due to sliding resistance between the sealing portion and the steering shaft.

To avoid such situation, it is conceivable to cause a lip of a cup-shaped grommet mounted on a steering gear box so as to surround the outer periphery of the steering shaft in a non-contact manner, to abut against the circumference of the opening in the dashboard through which the steering shaft passes, thereby preventing engine room noise from entering the vehicle compartment through the opening in the dashboard. However, if such a grommet is used, noise leaking from the steering gear box directly into the grommet enters the vehicle compartment through the opening in the dashboard, resulting in insufficient soundproofing effect.

SUMMARY OF THE INVENTION

The present invention has been achieved in view of the above-mentioned circumstances, and has a first object to effectively shut out noise transmitted from an engine room through an opening in a dashboard into a vehicle compartment, using a simple structure.

The present invention has a second object to prevent noise, which leaks from a steering gear box into a grommet, from entering the vehicle compartment through the opening in the dashboard.

In order to achieve the first object, according to a first feature of the present invention, there is provided a vehicle steering system comprising: an upper steering shaft extending downward from a steering wheel provided in a vehicle compartment to pass through an opening in a joint cover mounted on a dashboard; a lower steering shaft extending upward from a steering gear box provided in an engine room; a joint connecting the upper steering shaft to the lower steering shaft; and a sound absorbing material mounted on the joint so as to face the opening in the joint cover.

With the first feature, since sound absorbing material is mounted on the joint which connects the upper steering shaft extending downward from the steering wheel to the lower steering shaft extending upward from the steering gear box so as to face the opening in the joint cover mounted on the dashboard through which the upper steering shaft passes, the sound absorbing material can absorb noise generated in the steering gear box, thereby preventing the noise from entering the vehicle compartment from the engine room through the opening in the joint cover. The sound absorbing material needs to have only a simple shape, and thus it can be produced with low cost. Further, since the sound absorbing material is mounted using a joint, it can be easily mounted as compared to the case where it is mounted on the upper steering shaft. Furthermore, since the sound absorbing material does not come into sliding contact with the steering shaft and the joint cover, no sliding noise or sliding resistance is generated.

For purposes of understanding, but without restriction on the scope of the invention, an upper joint cover 14 in an exemplary embodiment discussed below corresponds to the joint cover according to the first feature of the present invention, a second steering shaft 20 in the embodiment corresponds to the upper steering shaft according to the first feature of the present invention, a third steering shaft 22 in the embodiment corresponds to the lower steering shaft according to the first feature of the present invention, and an elastic joint 21 in the embodiment corresponds to the joint according to the first feature of the present invention.

In order to achieve the second object, according to a second feature of the present invention, there is provided a vehicle steering system comprising: a steering shaft passing through an opening in a dashboard which separates an engine room containing a steering gear box from a vehicle compartment containing a steering wheel; a grommet fixed to the steering gear box so as to surround an outer periphery of the steering shaft; a lip of the grommet abutting against a circumference of the opening in the dashboard; and a sound insulator placed between a through-hole in the grommet through which the steering shaft passes and the opening in the dashboard.

With the second feature, since the lip of the grommet fixed to the steering gear box so as to surround the outer periphery of the steering shaft abuts against the circumference of the opening in the dashboard, it is possible to prevent dust and noise in the engine room from entering the vehicle compartment through the opening in the dashboard. Also, since the sound insulator is placed between a through-hole in the grommet through which the steering shaft passes and the opening in the dashboard, noise leaking from the steering gear box into the grommet can be prevented by the sound insulator from entering the vehicle compartment through the opening in the dashboard, and thus noise in the vehicle compartment can be reduced.

In addition to the second feature, according to a third feature of the present invention, the steering system further includes a universal joint provided on the steering shaft, and the sound insulator is a phase setting clip which positions the universal joint on the steering shaft with a predetermined phase difference.

With the third feature, since the phase setting clip which positions a universal joint on the steering shaft with a predetermined phase difference is used as the sound insulator, there is no need to dispose a special sound insulator, thereby contributing to reduction in the number of parts and the cost.

For purposes of understanding, but without restriction on the scope of the invention, a lower universal joint 23 in another exemplary embodiment discussed below corresponds to the universal joint according to the second or third feature of the present invention, a pinion shaft 24 in the embodiment corresponds to the steering shaft according to the second or third feature of the present invention, and a phase setting clip 58 in the embodiment corresponds to the sound insulator according to the second or third feature of the present invention.

The above-mentioned objects, other objects, characteristics, and advantages of the present invention will become apparent from an explanation of preferred embodiments, which will be described in detail below by reference to the attached drawings.

BRIEF DESCRIPTION OF THE DRAWINGS

FIG. 9 is a view corresponding to FIG. 2 and showing a second embodiment of the present invention.

FIG. 10 is an enlarged cross-sectional view taken on line 10-10 in FIG. 9.

FIG. 11 is a view taken and viewed in the direction of the arrow 11 in FIG. 10.

FIG. 12 is an enlarged cross-sectional view taken on line 12-12 in FIG. 10.

FIG. 13 is an exploded perspective view of a mount of a phase setting clip.

DESCRIPTION OF THE PRESENT EMBODIMENTS

A first embodiment of the present invention will be described by reference to FIGS. 1 to 8.

Figure 1:
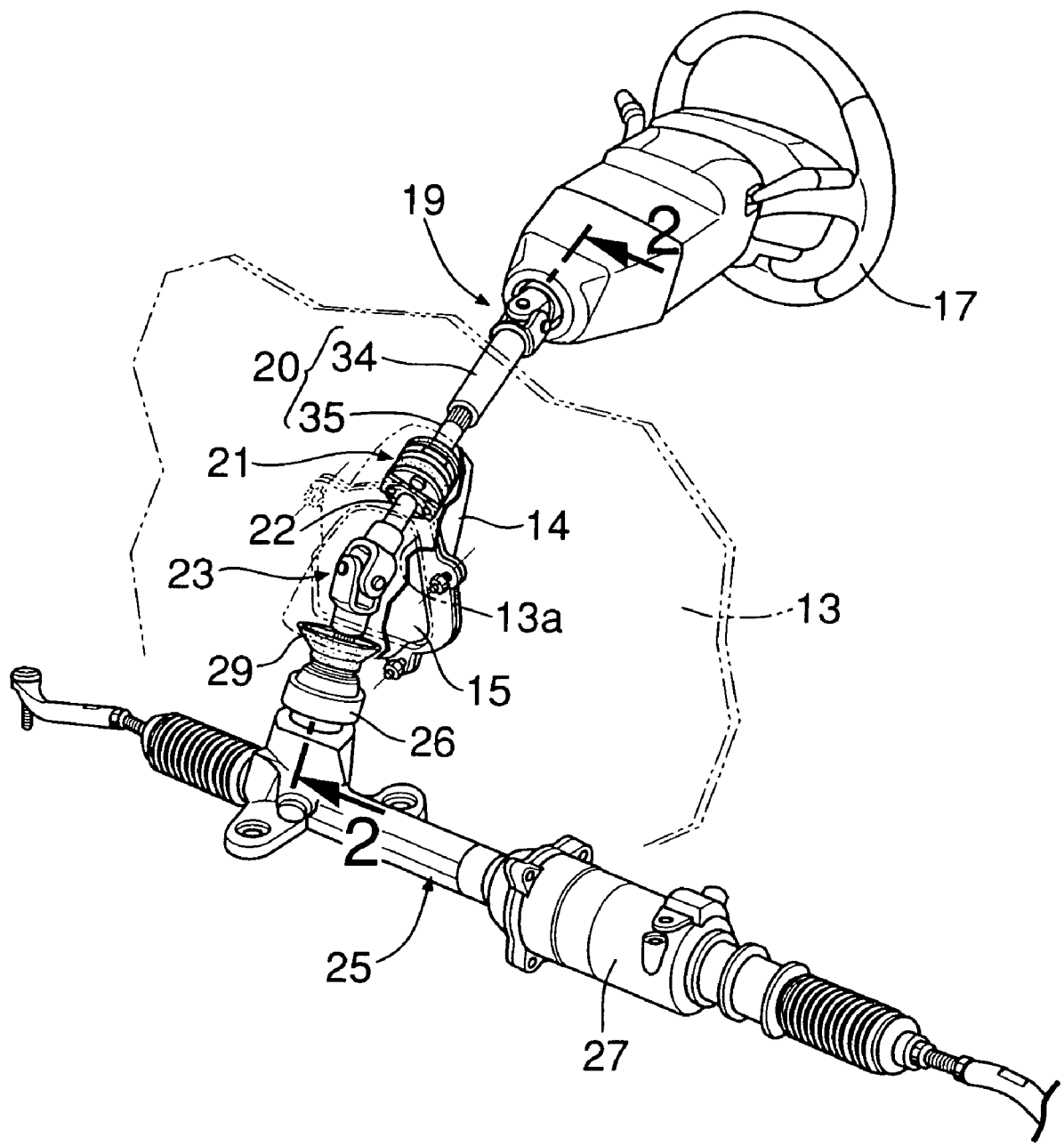
FIG. 1 is a perspective view of a vehicle steering system according to a first embodiment of the present invention.
Figure 2:
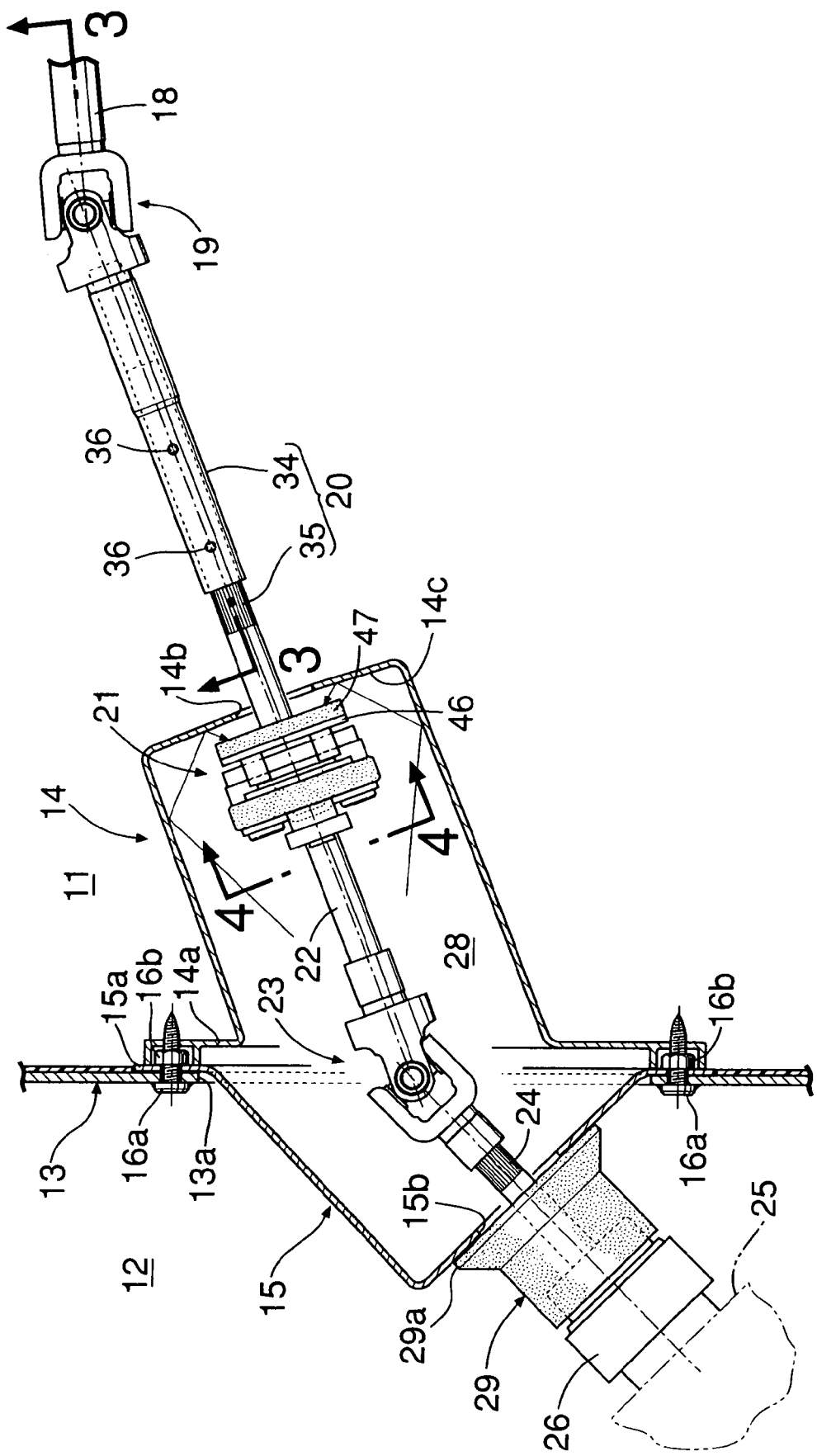
FIG. 2 is an enlarged cross-sectional view taken on line 2-2 in FIG. 1.

As shown in FIGS. 1 and 2, a flange 14a of an upper joint cover 14 on the side of a vehicle compartment 11 and a flange 15a of a lower joint cover 15 on the side of an engine room 12 are superposed and fixed to each other so as to cover an opening 13a formed in a dashboard 13 which separates the vehicle compartment 11 from the engine room 12. Meanwhile, three stud bolts 16a welded to the dashboard 13 are passed through the flange 15a of the lower joint cover 15 and fixed with nuts 16b, and the flange 14a of the upper joint cover 14 are fastened by the stud bolts 16a. A second steering shaft 20 is connected, via an upper universal joint 19, to the lower end of a first steering shaft 18 extending downward from a steering wheel 17 installed in the vehicle compartment 11. A third steering shaft 22 is connected, via an elastic joint 21, to the lower end of the second steering shaft 20. A pinion shaft 24 is connected, via a lower universal joint 23, to the lower end of the third steering shaft 22.

The pinion shaft 24 extends into a steering gear box 25 installed in the engine room 12, and rotation of the pinion shaft 24 is converted into reciprocating motion of a rack bar by a rack and pinion (not shown) housed in the steering gear box 25. A hydraulic pressure control valve 26 is provided on the outer periphery of the pinion shaft 24, and the hydraulic pressure control valve 26 is operated by steering torque inputted into the steering wheel 17 to switch the driving direction of a hydraulic cylinder 27 provided in the steering gear box 25, thereby constituting a hydraulic power steering system which hydraulically assists a driver's steering operation.

The elastic joint 21 and the lower universal joint 23 are housed in a space 28 formed by the lower joint cover 15 and the upper joint cover 14 which covers the opening 13a in the dashboard 13. The second steering shaft 20 extending upward from the elastic joint 21 passes through an opening 14b formed in the upper joint cover 14, while the pinion shaft 24 extending downward from the lower universal joint 23 passes through an opening 15b formed in the lower joint cover 15.

A rubber grommet 29 is mounted on the upper end of the hydraulic pressure control valve 26 in the steering gear box 25. An annular lip 29a of the grommet 29 abuts against the lower joint cover 15 so as to surround the circumference of the opening 15b, thereby preventing dust and noise in the engine room 12 from entering the vehicle compartment 11 through the opening 15b in the lower joint cover 15.

Figure 3:
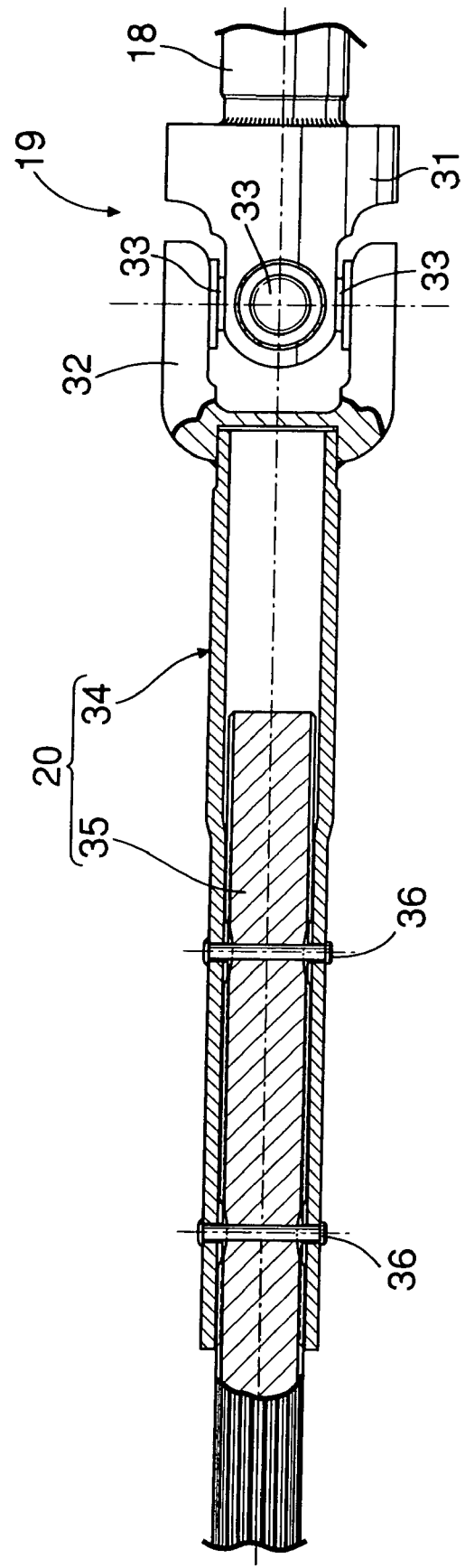
FIG. 3 is an enlarged cross-sectional view taken on line 3-3 in FIG. 2.
Figure 4:
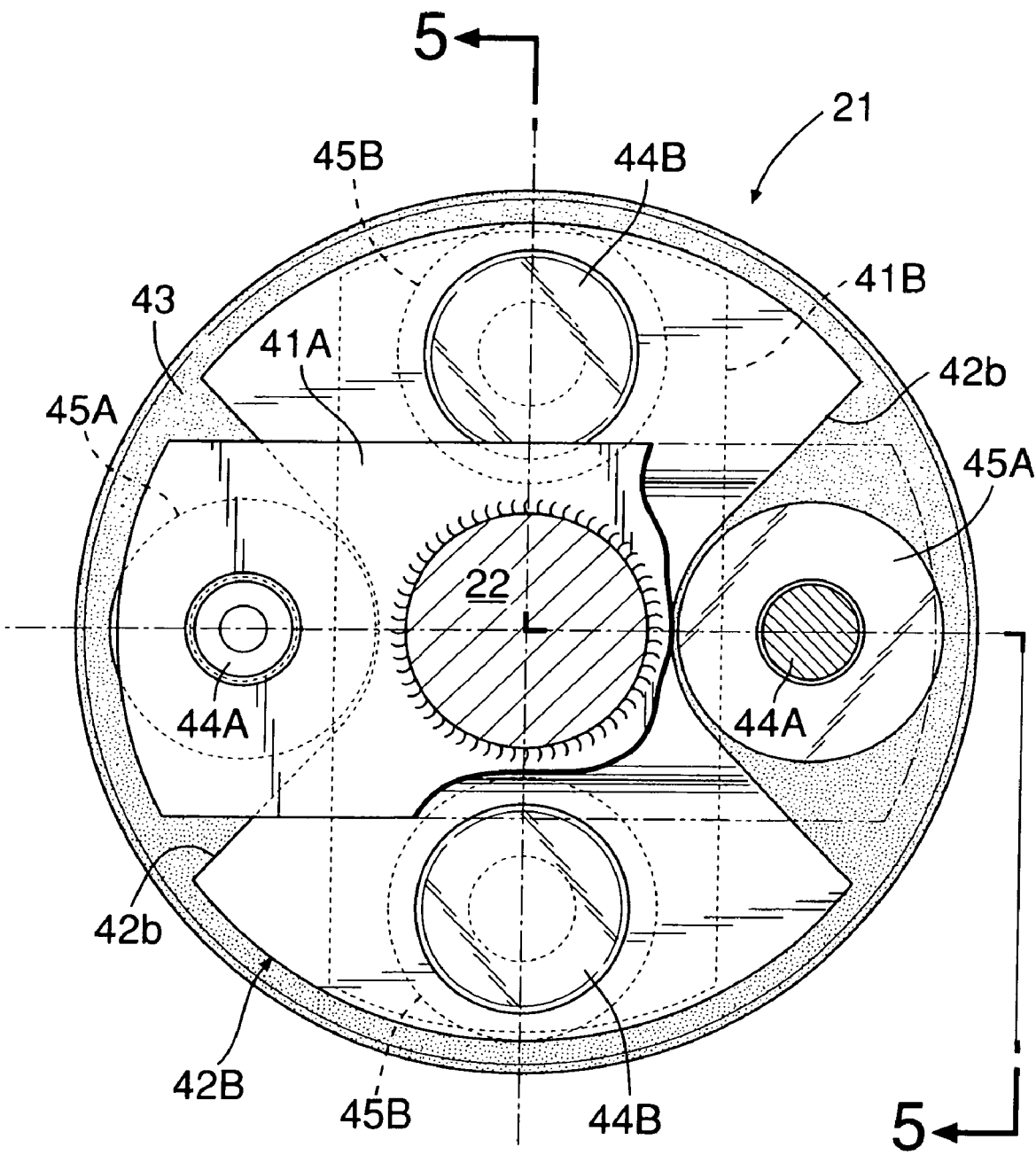
FIG. 4 is an enlarged view taken on line 4-4 and viewed in the direction of the arrows in FIG. 2.
Figure 5:
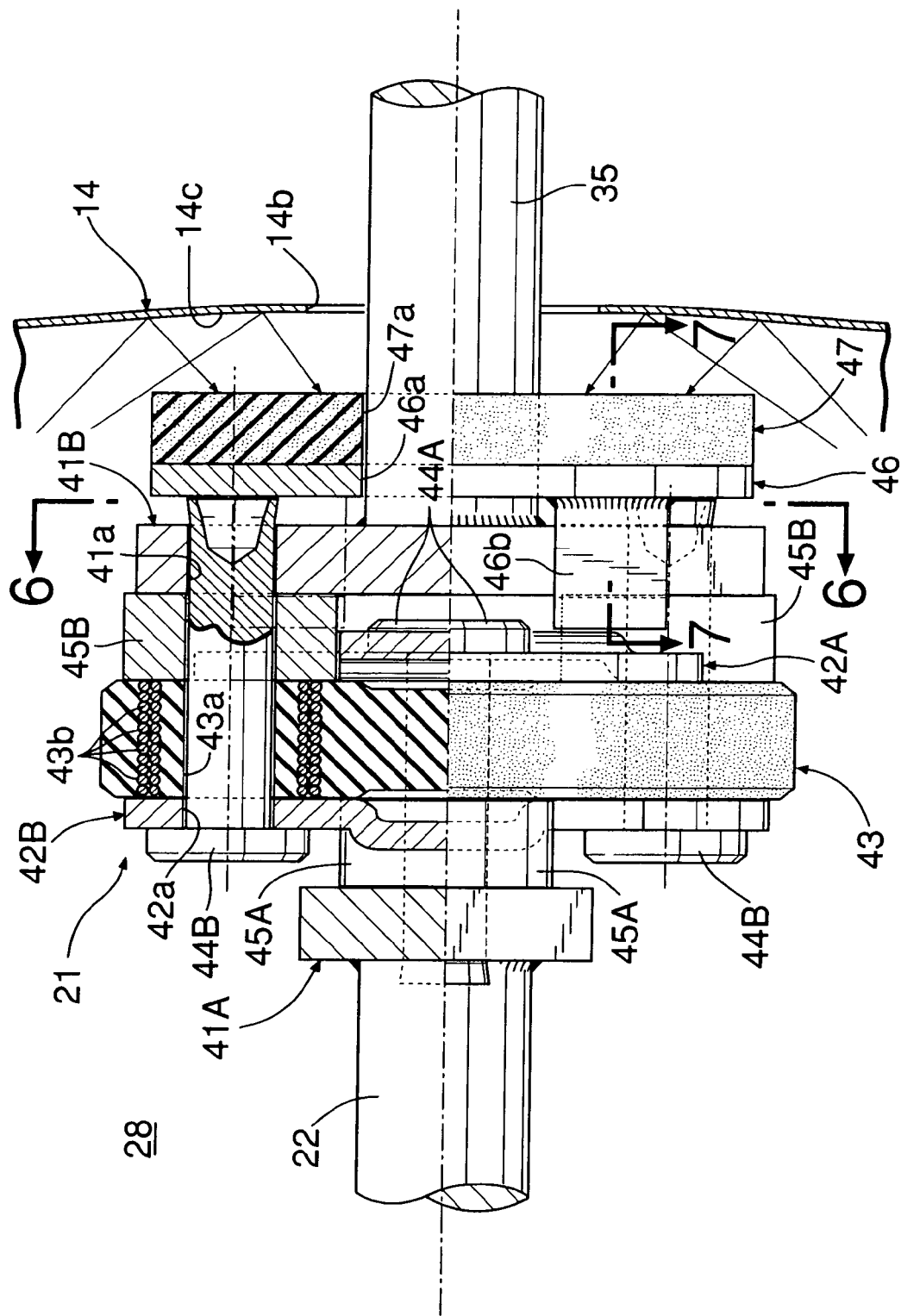
FIG. 5 is a cross-sectional view taken on line 5-5 in FIG. 4.
Figure 6:
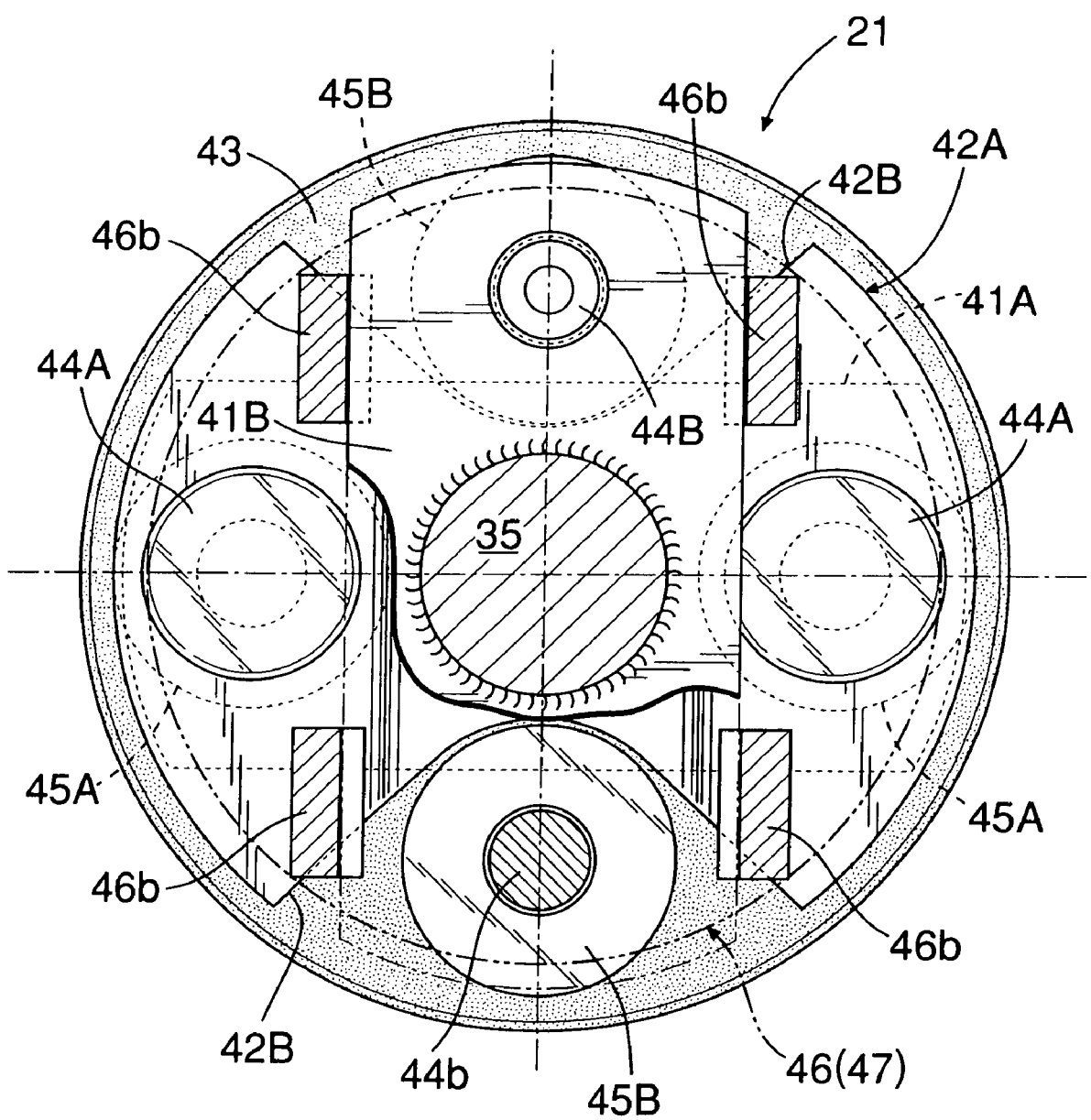
FIG. 6 is a view taken on line 6-6 and viewed in the direction of the arrows in FIG. 5.
Figure 7:
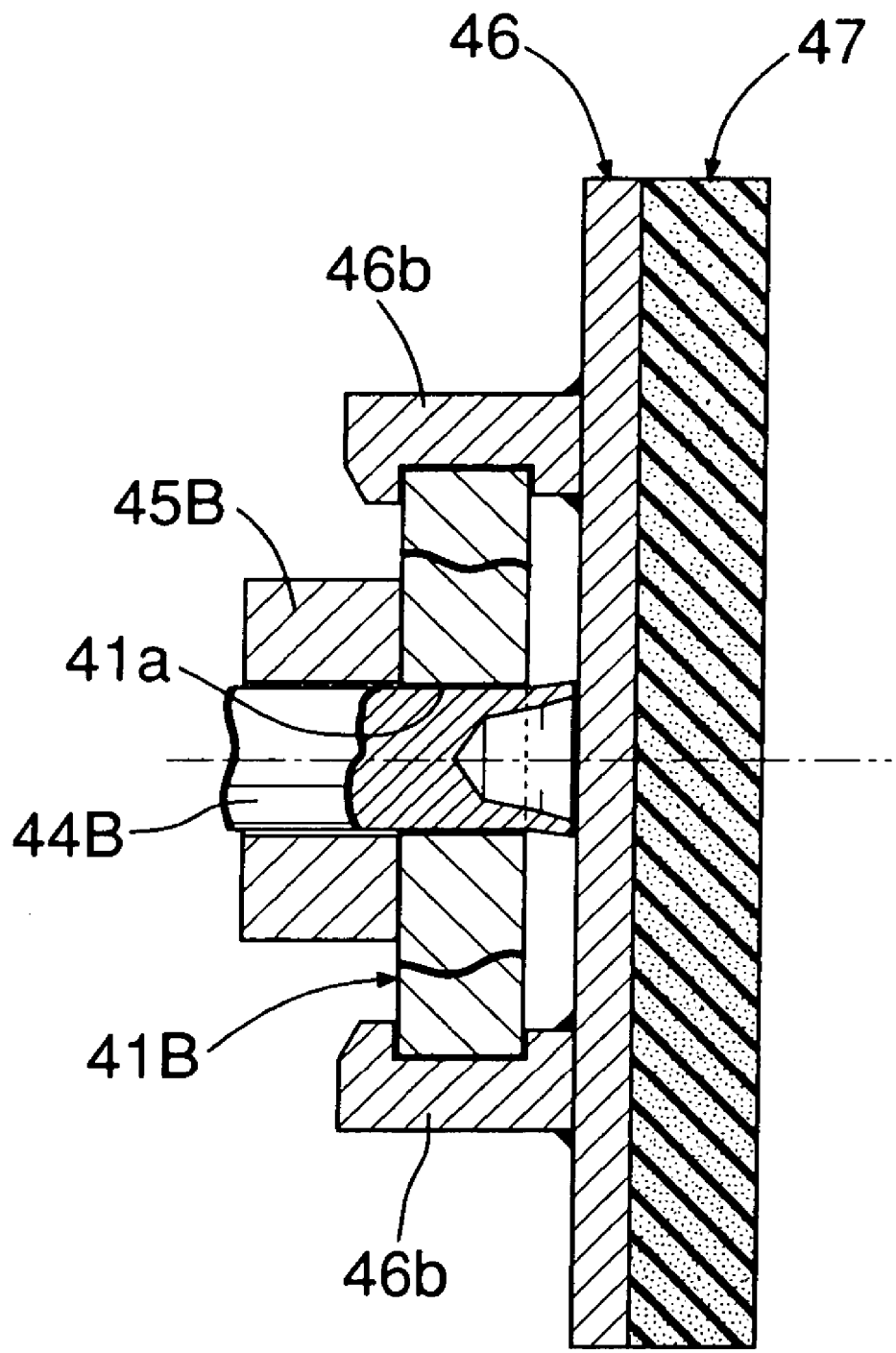
FIG. 7 is a cross-sectional view taken on line 7-7 in FIG. 5.
Figure 8:
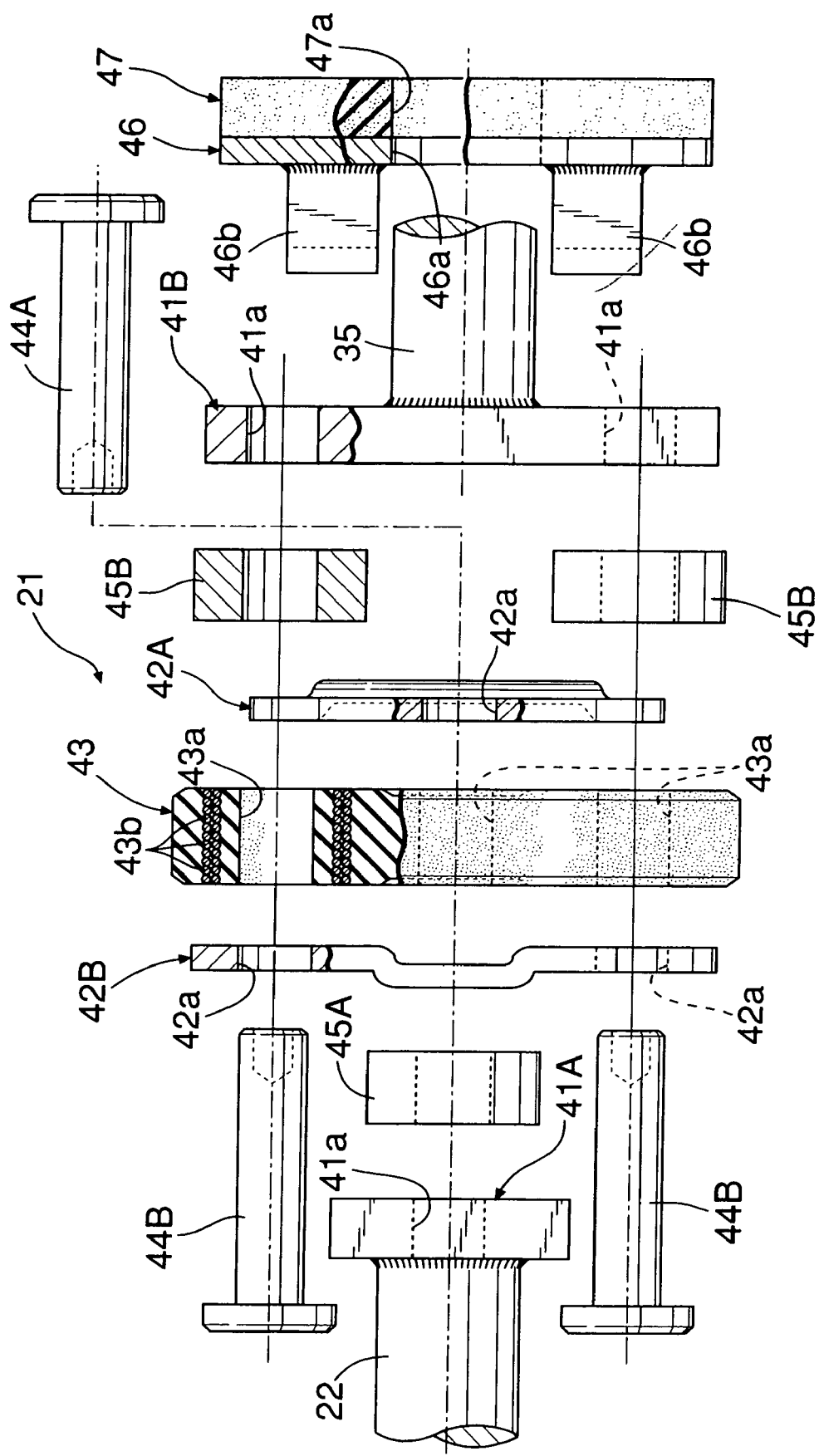
FIG. 8 is an exploded view of an elastic joint.

As can be seen from FIG. 3, the upper universal joint 19 which flexibly connects the first steering shaft 18 to the second steering shaft 20, consists of a U-shaped joint half 31 fixed to the first steering shaft 18, a U-shaped joint half 32 fixed to the second steering shaft 20, and a cross-shaped connecting pin 33 which couples together the joint halves 31 and 32. The second steering shaft 20 consists of a hollow upper shaft portion 34 fixed to the joint half 32 and a lower shaft portion 35 spline-fitted in the upper shaft portion 34. The upper shaft portion 34 and the lower shaft portion 35 are also coupled to each other by shear pins 36.

Thus, when the steering gear box 25 retreats upon collision of the vehicle and a compressive load acts on the second steering shaft 20 via the pinion shaft 24, the lower universal joint 23, the third steering shaft 22, and the elastic joint 21, the shear pins 36 are sheared off to allow the lower portion 35 of the second shaft 20 to slide upward with respect to the upper portion 34 of the second shaft, thereby reducing the upward thrust of the steering wheel 17 into the vehicle compartment 11.

As can be seen from FIGS. 4 to 8, the elastic joint 21 is equipped with a pair of connecting bars 41A and 41B fixed to the lower end of the lower shaft portion 35 of the second steering shaft 20 and the upper end of the third steering shaft 22, respectively, a pair of connecting plates 42A and 42B disposed inside from the connecting bars 41A and 41B, and a rubber damper 43 sandwiched by the connecting plates 42A and 42B. The above components are joined integrally by four rivets 44A; 44A and 44B; 44B.

The pair of connecting bars 41A and 41B are generally rectangular members each having two rivet holes 41a formed on opposite ends. They are placed 90 degrees out of phase with each other. The pair of connecting plates 42A and 42B are disk-shaped members, placed 90 degrees out of phase with each other. Two rivet holes 42a are provided on opposite ends of each connecting plate 42A and 42B, while two arc-shaped cuts 42b are provided at 90-degree intervals alternately from the two rivet holes 42a. The rubber damper 43 is a disk-shaped member with four rivet holes 43a formed at 90-degree intervals. Strands 43b are buried so as to surround the rivet holes 43a.

Two rivets 44A inserted into the two rivet holes 42a in the upper connecting plate 42A closer to the second steering shaft 20 are fastened by crimping after passing through the two rivet holes 43a in the rubber damper 43, two collars 45A placed in the two cuts 42b in the lower connecting plate 42B, and the two rivet holes 41a in the connecting bar 41A fixed to the upper end of the third steering shaft 22. Two rivets 44B inserted into the two rivet holes 42a in the lower connecting plate 42B closer to the third steering shaft 22 are fastened by crimping after passing through the two rivet holes 43a in the rubber damper 43, two collars 45B placed in the two cuts 42b in the upper connecting plate 42A, and the two rivet holes 41a in the connecting bar 41B fixed to the lower end of the lower shaft 35 of the second steering shaft 20.

A disk-shaped sound-absorbing-material holder 46 made of synthetic resin has four engagement protrusions 46b formed integrally on its one side face and has spongy sound absorbing material 47 fixed on its another side face by bonding or the like. The sound-absorbing-material holder 46 is fastened by engaging the engagement protrusions 46b with the connecting bar 41B on the upper side of the elastic joint 21. In this state, the lower shaft portion 35 of the second steering shaft 20 passes through an opening 46a in the center of the sound-absorbing-material holder 46 and an opening 47a in the center of the sound absorbing material 47. The sound absorbing material 47 faces the opening 14b in the upper joint cover 14 with a small clearance left therebetween. The sound absorbing material 47 is substantially larger in diameter than the opening 14b in the upper joint cover 14.

By interposing the elastic joint 21 having the rubber damper 43 between the second steering shaft 20 and the third steering shaft 22 in this way, it is possible to prevent vibration produced in the steering gear box 25, especially, vibration produced by the hydraulic pressure control valve 26, from being transmitted from the third steering shaft 22 to the second steering shaft 20, thereby reducing vibration transmitted to the steering wheel 17 and noise in the vehicle compartment 11.

Noise released from the hydraulic pressure control valve 26 in the steering gear box 25, which is a noise source, into the space 28 surrounded by the upper joint cover 14 and the lower joint cover 15, tends to spread into the vehicle compartment 11 through the opening 14b in the upper joint cover 14. At this time, the noise is not propagated directly into the vehicle compartment 11 through the opening 14b, because the diameter of the sound absorbing material 47 is larger than that of the opening 14b in the upper joint cover 14. Instead, the noise is reflected from an upper wall 14c, in which the opening 14b of the upper joint cover 14 is formed; then reflected from the sound absorbing material 47 facing the upper wall 14c; and propagated into the vehicle compartment 11 through the opening 14b. In this process, the noise is absorbed and reduced by the sound absorbing material 47, thereby greatly reducing the noise to be propagated into the vehicle compartment 11.

Since the sound absorbing material 47 is a disk-shaped sponge, it is remarkably inexpensive. Further, since the sound absorbing material 47 is mounted via the elastic joint 21, it can be mounted more easily as compared with the case where it is mounted on the second steering shaft 20. Furthermore, since the sound absorbing material 47 does not come into sliding contact with the second steering shaft 20 or the upper-joint cover 14, it does not produce sliding noise or sliding resistance.

Next, a second embodiment of the present invention will be described by reference to FIGS. 9 to 13.

Figure 9:
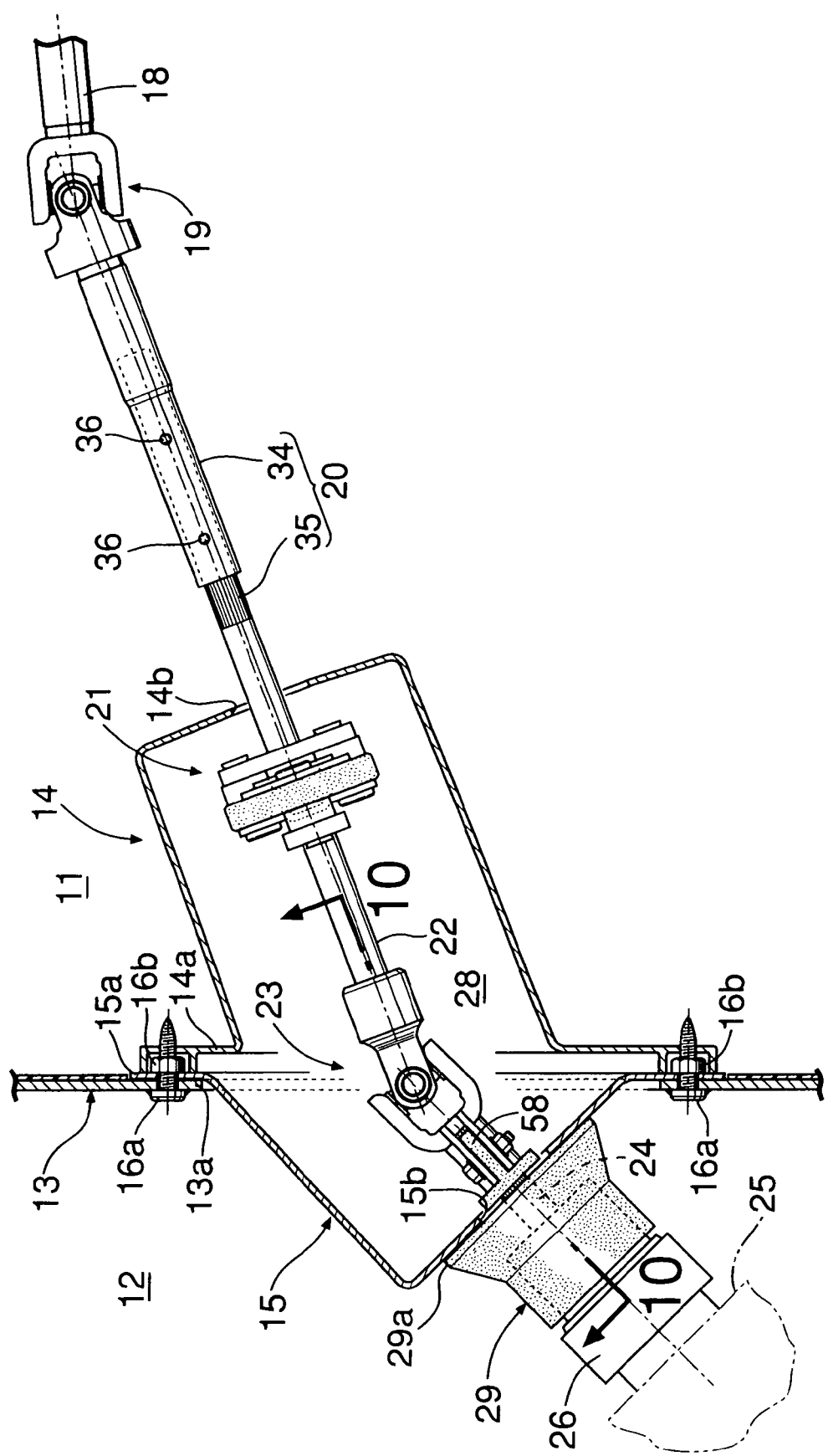
FIGS. 9 to 13 show a second embodiment of the present invention.

As can be seen in comparison between FIG. 2 (the first embodiment) and FIG. 9 (the second embodiment), the second embodiment does not include the sound absorbing material 47 mounted on the elastic joint 21 of the first embodiment, and includes a phase setting clip 58 instead. In the second embodiment, the upper joint cover 14 and the lower joint cover 15 constitute part of the dashboard 13, and the opening 14b in the upper joint cover 14 and the opening 15b in the lower joint cover 15 constitute an opening in the dashboard 13.

As shown in FIGS. 10 to 13, the pinion shaft 24 protruding upward from the hydraulic pressure control valve 26 through a ball bearing 51, includes a hollow shaft body 52 and a torsion bar 54 housed in and coupled, by a pin 53, to the hollow shaft body 52. The pinion shaft 24 drives the hydraulic pressure control valve 26 using torsion of the torsion bar 54 caused by steering torque. The grommet 29 mounted on the upper end of the hydraulic pressure control valve 26 with the lip 29a on its outer periphery abutted against the lower joint cover 15, has a through-hole 29b. The pinion shaft 24 extends into the space 28 after passing through the opening 15b in the lower joint cover 15 without sliding contact with the through-hole 29b in the grommet 29.

The lower universal joint 23 which connects the lower end of the third steering shaft 22 with the upper end of the pinion shaft 24 consists of a U-shaped joint half 55 fixed to the third steering shaft 22, a U-shaped joint half 56 fixed to the pinion shaft 24, and a cross-shaped connecting pin 57 which couples together the joint halves 55 and 56. The phase setting clip 58 is mounted between the pinion shaft 24 and joint half 56. The phase setting clip 58 has function to keep constant the assembling phase of the joint half 56 relative to the pinion shaft 24, and set the phase difference between the upper universal joint 19 and the lower universal joint 23 to be a predetermined value to ensure constant velocity.

The phase setting clip 58 includes: a first annular portion 58a fitted over a spline 52a formed on an upper part of the shaft body 52 of the pinion shaft 24; a second annular portion 58b fitted over a small-diameter portion 52b at the upper end of the shaft body 52; and an arm portion 58c which connects the first annular portion 58a to the second annular portion 58b. A U-shaped cut 58d is formed in the middle of the arm portion 58c. On the other hand, the joint half 56 on the side of the pinion shaft 24 includes: a cylindrical portion 56a which has a spline 56b formed in the inner periphery and part of which is recessed in the axial direction; and a pair of fastening portions 56c which protrude in the radial direction from opposite edges of the cut in the cylindrical portion 56a.

When fixing the joint half 56 to the pinion shaft 24, first, the first annular portion 58a of the phase setting clip 58 is engaged with the spline 52a on the shaft body 52 of the pinion shaft 24. At this time, by setting the left and right wheels as well as the pinion shaft 24 at neutral position and by engaging the phase setting clip 58 with the shaft body 52 with a predetermined phase difference, it is possible to uniquely determine the phase of the phase setting clip 58 with respect to the pinion shaft 24.

Next, the joint half 56 is inserted in the axial direction onto the pinion shaft 24 on which the phase setting clip 58 is mounted; the spline 56*b* of the cylindrical portion 56*a* is coupled to the spline 52*a* on the shaft body 52 of the pinion shaft 24; and the arm portion 58*c* of the phase setting clip 58 is sandwiched between the pair of fastening portions 56*c* and fastened by a bolt 59 and nut 60, the bolt 59 passing through bolt holes 56*d* in the fastening portions 56*c* and the cut 58*d* in the arm portion 58*c*.

With the engagement between the arm portion 58*c* of the phase setting clip 58 and the fastening portions 56*c* of the joint half 56, the joint half 56 is assembled with a predetermined phase difference with respect to the phase setting clip 58. Consequently, the joint half 56 can be mounted with a predetermined phase difference with respect to the pinion shaft 24.

Figure 10:
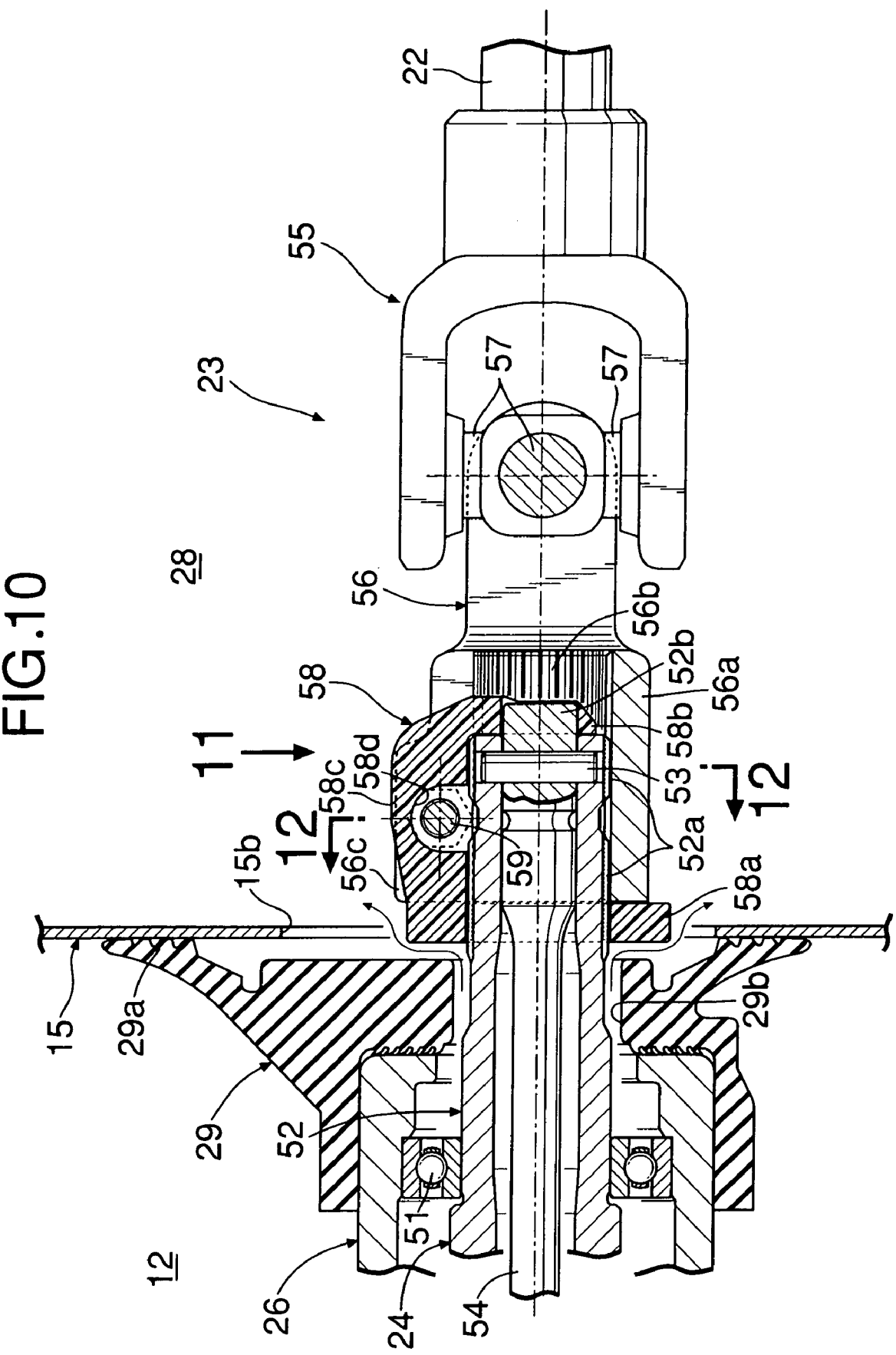
Figure 11:
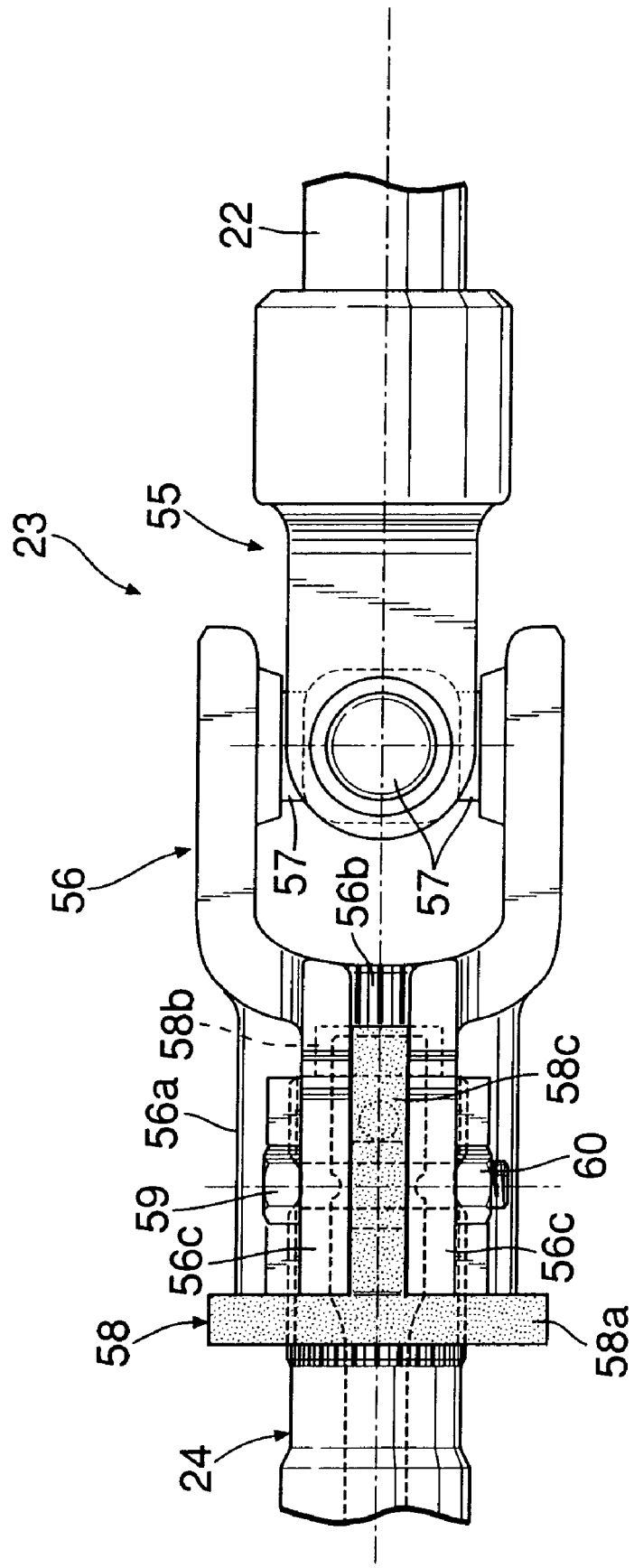
Figure 12:
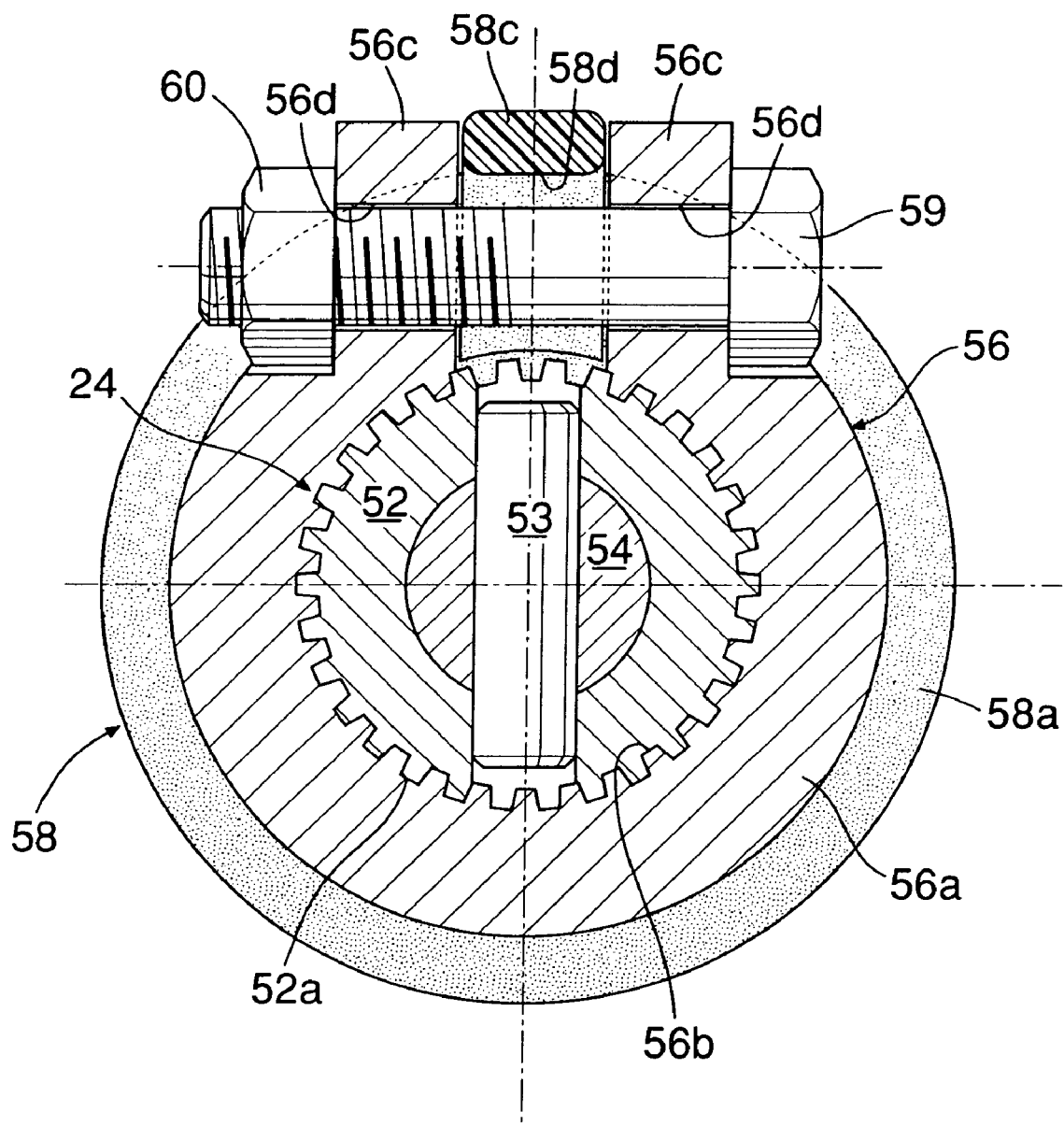
Figure 13:
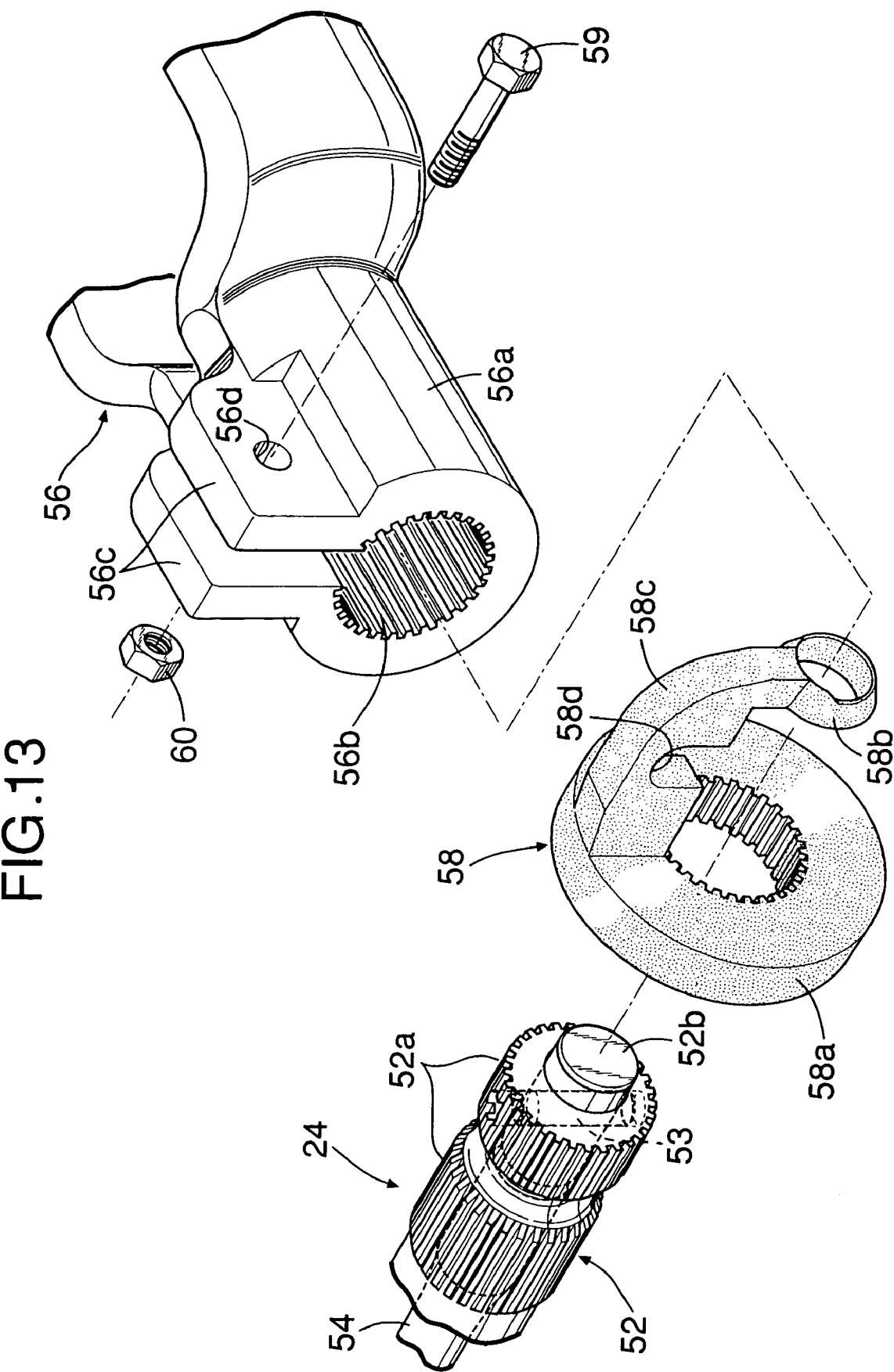

As can be seen from FIG. 10, the first annular portion 58*a* of the phase setting clip 58 mounted between the pinion shaft 24 and the lower universal joint 23 is larger in diameter than the through-hole 29*b* in the grommet 29, and thus it functions as a sound insulating wall. Specifically, the first annular portion 58*a* of the phase setting clip 58 blocks the noise which is produced in the hydraulic pressure control valve 26 of the steering gear box 25, and which is about to enter the vehicle compartment 11 through the opening 14*b* in the upper joint cover 14 after passing through the clearance between the outer peripheral surface of the pinion shaft 24 and the inner peripheral surface of the through-hole 29*b* in the grommet 29, the opening 15*b* in the lower joint cover 15, and the space 28. As a result, the noise hardly passes through the opening 15*b* in the lower joint cover 15, resulting in reduction of noise in the vehicle compartment.

Also, since sound insulating effect can be obtained in a non-contact manner without bringing the lip seal into contact with the pinion shaft 24, the noise in the vehicle compartment 11 can be reduced without the problem of sliding noise, sliding resistance, or the like.

In particular, since the phase setting clip 58 which places the lower universal joint 23 with a predetermined phase difference with respect to the pinion shaft 24 is used as a sound insulator, the need for mounting a special sound insulator is eliminated, thereby contributing to reduction in the number of parts and the cost.

Since the phase setting clip 58 according to this embodiment has an outer diameter larger than the inner diameter of the through-hole 29*b* in the grommet 29, during assembling, first the grommet 29 must be mounted to the hydraulic pressure control valve 26, and then the phase setting clip 58 is mounted.

Although the embodiments of the present invention have been described above, the present invention is not limited thereto, and various design changes may be made without departing from the subject matter of the present invention set forth in the appended claims.

For example, the material of the sound absorbing material 47 in the first embodiment is not limited to sponge, and may be any material as long as it absorbs sound.

Although the phase setting clip 58 is used as a sound insulator in the second embodiment, a special sound insulator may be used.

Although the grommet 29 abuts against the lower joint cover 15 in the second embodiment, it may abut against the dashboard 13 or the upper joint cover 14, noting that the covers 14, 15 are effectively extensions or projections of the dashboard 13. If the grommet abutted against the dashboard 13, and the sound insulator 58*a* were disposed in the opening 13*a* in the dashboard, the structure would appear the same as shown in FIG. 10, except that the joint cover 15 with the opening 15*b* would be replaced with the dashboard 13 having the opening 13*a*.

A projection and a recess which can be engaged with each other may be provided on one and the other of the phase setting clip 58 and the pinion shaft 24 in order to mount the phase setting clip 58 to the pinion shaft 24 with a predetermined phase difference.

What is claimed is:

1. A vehicle steering system comprising:
   an upper steering shaft extending downward from, and being operatively connected to a steering wheel provided in a vehicle passenger compartment to pass through an opening in a first joint cover mounted on a dashboard;
   a lower steering shaft extending upward from, and being operatively connected to a steering gear box provided in an engine room;
   a joint connecting the upper steering shaft to the lower steering shaft; and
   a sound absorbing material mounted directly on the joint so as to face the opening in the first joint cover.

2. The vehicle steering system according to claim 1, wherein said sound absorbing material is disposed at an end of said joint in spaced proximity to said opening in the joint cover, such that the gap between the joint and the sound absorbing material is less than the thickness of the sound absorbing material.

3. The vehicle steering system according to claim 1, wherein said sound absorbing material is a spongy material.

4. The vehicle steering system according to claim 1, wherein said joint is an elastic joint disposed in spaced proximity to said opening in the joint cover, such that the gap between the joint and the sound absorbing material is less than the thickness of the sound absorbing material.

5. The vehicle steering system according to claim 1, wherein a diameter of said sound absorbing material is larger than a diameter of said opening in the joint cover.

6. The vehicle steering system according to claim 1, wherein the system is configured such that said sound absorbing material moves concurrently with said upper steering shaft.

7. The vehicle steering system according to claim 1, further including a pinion shaft and a grommet fixed to the steering gear box so as to surround an outer periphery of the pinion shaft, a lip of the grommet abutting against a circumference of an opening in a second joint cover which extends outwardly from the dashboard and which cooperates with the first joint cover to substantially surround the joint.

8. The vehicle steering system of claim 1, wherein an inner portion of the first joint cover extends inwardly into the vehicle passenger compartment, and wherein the sound-absorbing material is spaced away from the dashboard and disposed proximate the inner portion of the first joint cover.

9. A vehicle steering system comprising:
   a pinion shaft passing through an opening in a dashboard which separates an engine room containing a steering gear box from a vehicle passenger compartment containing a steering wheel;
   a joint cover attached to the dashboard and having an opening formed therein;
   a grommet fixed to the steering gear box so as to surround an outer periphery of the pinion shaft;

a lip of the grommet abutting against a circumference of the opening in the joint cover; and a sound insulator placed between the opening in the joint cover and a through-hole in the grommet through which the pinion shaft passes.

10. The vehicle steering system according to claim 9, further including a universal joint provided on the pinion shaft, and wherein the sound insulator comprises a portion of a phase setting clip which positions said universal joint on the pinion shaft with a predetermined phase difference.

11. The vehicle steering system according to claim 10, wherein said sound insulator is an annular portion at one end of said phase setting clip disposed within the opening of the joint cover in spaced proximity to an end of the through-hole in the grommet, such that a gap between the grommet and the sound insulator is less than the thickness of the sound insulator.

12. The vehicle steering system according to claim 11, wherein said annular portion at one end of said phase setting clip has a diameter larger than a diameter of the through-hole in the grommet and smaller than a diameter of the opening in the joint cover.

13. The vehicle steering system according to claim 9, wherein said sound insulator has a diameter larger than a diameter of the through-hole in the grommet and smaller than a diameter of the opening in the dashboard, and said sound insulator is disposed within the opening of the dashboard in spaced proximity to an end of the through-hole in the grommet, such that a gap between the grommet and the sound insulator is less than the thickness of the sound insulator.

14. The vehicle steering system according to claim 9, wherein the system is configured such that said sound insulator moves concurrently with said pinion shaft.

15. A vehicle steering system comprising:

a pinion shaft passing through an opening in a joint cover mounted on a dashboard which separates an engine room containing a steering gear box from a vehicle passenger compartment containing a steering wheel;

a grommet fixed to the steering gear box so as to surround an outer periphery of the pinion shaft;

a lip of the grommet abutting against a circumference of the opening in the joint cover;

a sound insulator placed between the opening in the joint cover and a through-hole in the grommet through which the pinion shaft passes and; and a universal joint provided on the pinion shaft, wherein the sound insulator comprises a phase setting clip which positions the universal joint on the pinion shaft with a predetermined phase difference.

16. The vehicle steering system according to claim 15, wherein said sound insulator comprises an annular portion at one end of said phase setting clip disposed within the opening of the joint cover in spaced proximity to an end of the through-hole in the grommet, such that a gap between the grommet and the sound insulator is less than the thickness of the sound insulator.

17. The vehicle steering system according to claim 16, wherein said one end of said phase setting clip has a diameter larger than a diameter of the through-hole in the grommet and smaller than a diameter of the opening in the joint cover.

18. The vehicle steering system according to claim 15, wherein said sound insulator has a diameter larger than a diameter of the through-hole in the grommet and smaller than a diameter of the opening in the joint cover, and said sound insulator is disposed within the opening of the joint cover in spaced proximity to an end of the through-hole in the grommet, such that a gap between the grommet and the sound insulator is less than the thickness of the sound insulator.

19. The vehicle steering system according to claim 15, wherein the system is configured such that said sound insulator moves concurrently with said pinion shaft.

* * * * *